(12) United States Patent
Park et al.

(10) Patent No.: US 10,372,787 B2
(45) Date of Patent: Aug. 6, 2019

(54) HARDWARE ACCELERATOR PRE-CONFIGURED WITH COEFFICIENTS FOR MATRIX-TRANSFORM OPERATIONS

(71) Applicant: Facebook, Inc., Menlo Park, CA (US)

(72) Inventors: Jong Soo Park, Mountain View, CA (US); Nadav Rotem, Santa Clara, CA (US); Mikhail Smelyanskiy, Burlingame, CA (US); Abdulkadir Utku Diril, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 38 days.

(21) Appl. No.: 15/839,229

(22) Filed: Dec. 12, 2017

(65) Prior Publication Data

US 2019/0179869 A1    Jun. 13, 2019

(51) Int. Cl.
| | |
|---|---|
| *G06F 17/16* | (2006.01) |
| *G06F 7/523* | (2006.01) |
| *G06F 12/0875* | (2016.01) |
| *G06N 3/02* | (2006.01) |
| *G06N 20/00* | (2019.01) |

(52) U.S. Cl.
CPC .............. *G06F 17/16* (2013.01); *G06F 7/523* (2013.01); *G06F 12/0875* (2013.01); *G06N 3/02* (2013.01); *G06N 20/00* (2019.01)

(58) Field of Classification Search
CPC ...... G06F 17/16; G06F 12/0875; G06F 7/523; G06N 20/00; G06N 3/02
USPC ......................................................... 708/607
See application file for complete search history.

(56) References Cited

U.S. PATENT DOCUMENTS

| | | | |
|---|---|---|---|
| 2012/0221617 A1* | 8/2012 | Subbarao ............... | G06F 17/13 708/404 |
| 2014/0289445 A1* | 9/2014 | Savich ................ | G06F 13/4022 710/317 |
| 2018/0189237 A1* | 7/2018 | Werner ................. | G06F 17/144 |
| 2018/0248562 A1* | 8/2018 | Redfern ................. | H03M 7/30 |
| 2018/0293691 A1* | 10/2018 | Nurvitadhi ............ | G06F 9/3001 |

OTHER PUBLICATIONS

Chang, et. al, "Hardware accelerators for Recurrent Neural Networks on FPGA," Circuits and Systems (ISCAS), 2017 IEEE International Symposium on, May 28-31, 2017.

(Continued)

*Primary Examiner* — Tan V Mai

(74) *Attorney, Agent, or Firm* — FisherBroyles, LLP

(57) ABSTRACT

A special-purpose hardware accelerator may include a cache configured to store an input matrix related to performing a convolution operation and a matrix-multiplication subsystem pre-configured with matrix-transform coefficients for performing matrix-transform operations. The matrix-multiplication subsystem may perform the convolution operation by (1) reading the input matrix from the cache, (2) transforming the input matrix via matrix multiplication, (3) transforming, via matrix multiplication, a parameter matrix that includes convolution parameters for performing the convolution operation, (4) applying the transformed parameter matrix to the transformed input matrix via an element-wise multiplication operation, and then (5) performing an inverse-transformation operation on the results of the element-wise multiplication operation to create an output matrix for the convolution operation. Various other systems and methods are also disclosed.

20 Claims, 11 Drawing Sheets

(56) References Cited

OTHER PUBLICATIONS

Kim et. al, "FPGA-Based CNN Inference Accelerator Synthesized from Multi-Threaded C Software," System-on-Chip Conference (SOCC), 2017 30th IEEE International, available at www.legupcomputing.com/static/pdfs/IEEE_SOCC_FINAL.pdf.

Kiningham et. al, "Design and Analysis of a Hardware CNN Accelerator," available at cs231n.stanford.edu/reports/2017/pdfs/116.pdf.

Lavin et. al, "Fast Algorithms for Convolutional Neural Networks," 2016 IEEE Conference on Computer Vision and Pattern Recognition (CVPR), 4013-4021 10.1109/CVPR.2016.435.

Liu et. al, "Efficient Sparse-Winograd Convolutional Neural Networks," ICLR 2017.

Warden, Pete, "Why GEMM is at the heart of deep learning," available at petewarden.com/2015/04/20/why-gemm-is-at-the-heart-of-deep-learning/.

\* cited by examiner

HARDWARE ACCELERATOR PRE-CONFIGURED WITH COEFFICIENTS FOR MATRIX-TRANSFORM OPERATIONS

BACKGROUND

Artificial intelligence (AI) can enable computers to perform a variety of complicated tasks, including tasks related to cognitive functions, such as "learning," that are typically associated with humans. Several approaches to AI are prevalent, including machine-learning techniques. In machine-learning systems, a computer may be programmed to parse data, learn from the data, and make predictions from real-world inputs. One machine-learning model, referred to as an artificial neural network, was inspired by the interconnections of neurons in a biological brain. Neural networks and other machine-learning systems are widely used to perform a variety of AI-related tasks, including speech recognition and computer vision.

Unfortunately, neural networks are often extremely computationally intensive. For example, convolutional neural networks (CNN), which typically apply convolution operations to an input matrix in an effort to emulate the response of a biological neuron to visual stimuli, may tax even the most advanced computing systems. Although researchers have begun using domain-transformation-based algorithms (such as Fast Fourier Transform (FFT)-based algorithms and so-called Winograd minimal filtering algorithms) in an attempt to reduce the number of arithmetic operations required to perform, and thus improve the performance of, the convolution operations required by CNNs, the sheer number of convolution operations typically required by a CNN means that even small gains in neural network efficiency and/or throughput may result in tremendous computational and/or energy savings. The instant disclosure, therefore, identifies and addresses a need for systems and methods for improving the efficiency and/or performance of machine-learning systems and other processing systems in which convolution operations are required or useful.

SUMMARY

As will be described in greater detail below, the instant disclosure describes a special-purpose hardware accelerator pre-configured with the coefficients used to perform some or all of the domain-transform operations used in modern convolution operations, such as Winograd minimal filtering convolutions. For example, a special-purpose hardware accelerator may include a cache configured to store an input matrix related to performing a convolution operation and a matrix-multiplication subsystem pre-configured with matrix-transform coefficients for performing matrix-transform operations. The matrix-multiplication subsystem may be configured to perform the convolution operation by (1) reading the input matrix from the cache, (2) transforming the input matrix via matrix multiplication, (3) transforming, via matrix multiplication, a parameter matrix that includes convolution parameters for performing the convolution operation, (4) applying the transformed parameter matrix to the transformed input matrix via an element-wise multiplication operation, and then (5) performing an inverse-transformation operation on the results of the element-wise multiplication operation to create an output matrix for the convolution operation. In some examples, the matrix-multiplication subsystem may use the pre-configured matrix-transform coefficients to transform the input matrix, to transform the parameter matrix, and/or to perform the inverse-transformation operation on the results of the element-wise multiplication operation.

The pre-configured matrix-transform coefficients may include pre-configured coefficients for transforming the input matrix, pre-configured coefficients for transforming the parameter matrix, and/or pre-configured coefficients for performing the inverse-transformation operation on the results of the element-wise multiplication operation. The pre-configured matrix-transform coefficients may also include a transposed version of the pre-configured coefficients for transforming the input matrix, a transposed version of the pre-configured coefficients for transforming the parameter matrix, and/or a transposed version of the pre-configured coefficients for performing the inverse-transformation operation on the results of the element-wise multiplication operation. Alternatively, the matrix-multiplication subsystem may directly transpose the pre-configured coefficients using in-place matrix transposition.

In one example, the matrix-multiplication subsystem may include a dot-product engine configured to perform the matrix-transform operations and/or an element-wise multiplier configured to perform the element-wise multiplication operation. In this example, the matrix-multiplication subsystem may transform the input matrix on-the-fly when reading the input matrix from the cache to the element-wise multiplier.

In one embodiment, the parameter matrix may be stored in the cache of the matrix-multiplication subsystem. In this embodiment, the matrix-multiplication subsystem may transform the parameter matrix on-the-fly when reading the parameter matrix from the cache to the element-wise multiplier. In another embodiment, the matrix-multiplication subsystem may perform the inverse-transformation operation on-the-fly when storing the output matrix to the cache.

In some examples, (1) the input matrix may include the entirety of an input volume for the convolution operation, (2) transforming the input matrix via matrix multiplication may include transforming the entire input volume via matrix multiplication, and (3) the output matrix may include the entirety of an output volume for the convolution operation. In other examples, (1) the input matrix may include an initial portion of an input volume for the convolution operation, (2) transforming the input matrix via matrix multiplication may include transforming the initial portion of the input volume via matrix multiplication, and (3) creating the output matrix may include creating an initial portion of an output volume for the convolution operation. In these examples, performing the convolution operation may include (1) receiving at least one additional portion of the input volume from the cache, (2) transforming the additional portion of the input volume via matrix multiplication, (3) applying, via an additional element-wise multiplication operation, the transformed parameter matrix to the additional portion of the input volume that was transformed, and then (4) performing an additional inverse-transformation operation on the results of the additional element-wise multiplication operation to create an additional portion of the output volume for the convolution operation.

In some embodiments, the special-purpose hardware accelerator may be configured to pose each of a plurality of element-wise multiplication operations as a plurality of dot-product operations and then batch the plurality of dot-product operations into a single matrix-multiplication operation for processing by the matrix-multiplication subsystem.

In one example, the above-described hardware accelerator may be integrated within a larger computing system. For example, a computing system may include a memory device configured to store an input matrix related to performing a convolution operation and a special-purpose hardware accelerator with a matrix-multiplication subsystem that is pre-configured with matrix-transform coefficients for performing matrix-transform operations. In this example, the matrix-multiplication subsystem may perform the convolution operation by (1) reading the input matrix from the memory device, (2) transforming the input matrix via matrix multiplication, (3) transforming, via matrix multiplication, a parameter matrix that includes convolution parameters for performing the convolution operation, (4) applying the transformed parameter matrix to the transformed input matrix via an element-wise multiplication operation, and then (5) performing an inverse-transformation operation on the results of the element-wise multiplication operation to create an output matrix for the convolution operation. The matrix-multiplication subsystem may use the pre-configured matrix-transform coefficients to transform the input matrix, to transform the parameter matrix, and/or to perform the inverse-transformation operation on the results of the element-wise multiplication operation.

In some embodiments, the matrix-multiplication subsystem may include a cache. In these embodiments, reading the input matrix from the memory device may include (1) storing the input matrix from the memory device into the cache and then (2) reading the input matrix from the cache.

In one example, a corresponding computer-implemented method may include reading, from a cache of a special-purpose hardware accelerator, an input matrix related to performing a convolution operation. In this example, the special-purpose hardware accelerator may be pre-configured with matrix-transform coefficients for performing matrix-transform operations. The method may also include performing, using the special-purpose hardware accelerator, the convolution operation by (1) transforming the input matrix via matrix multiplication, (2) transforming, via matrix multiplication, a parameter matrix that includes convolution parameters for performing the convolution operation, (3) applying the transformed parameter matrix to the transformed input matrix via an element-wise multiplication operation, and then (4) performing an inverse-transformation operation on the results of the element-wise multiplication operation to create an output matrix for the convolution operation.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
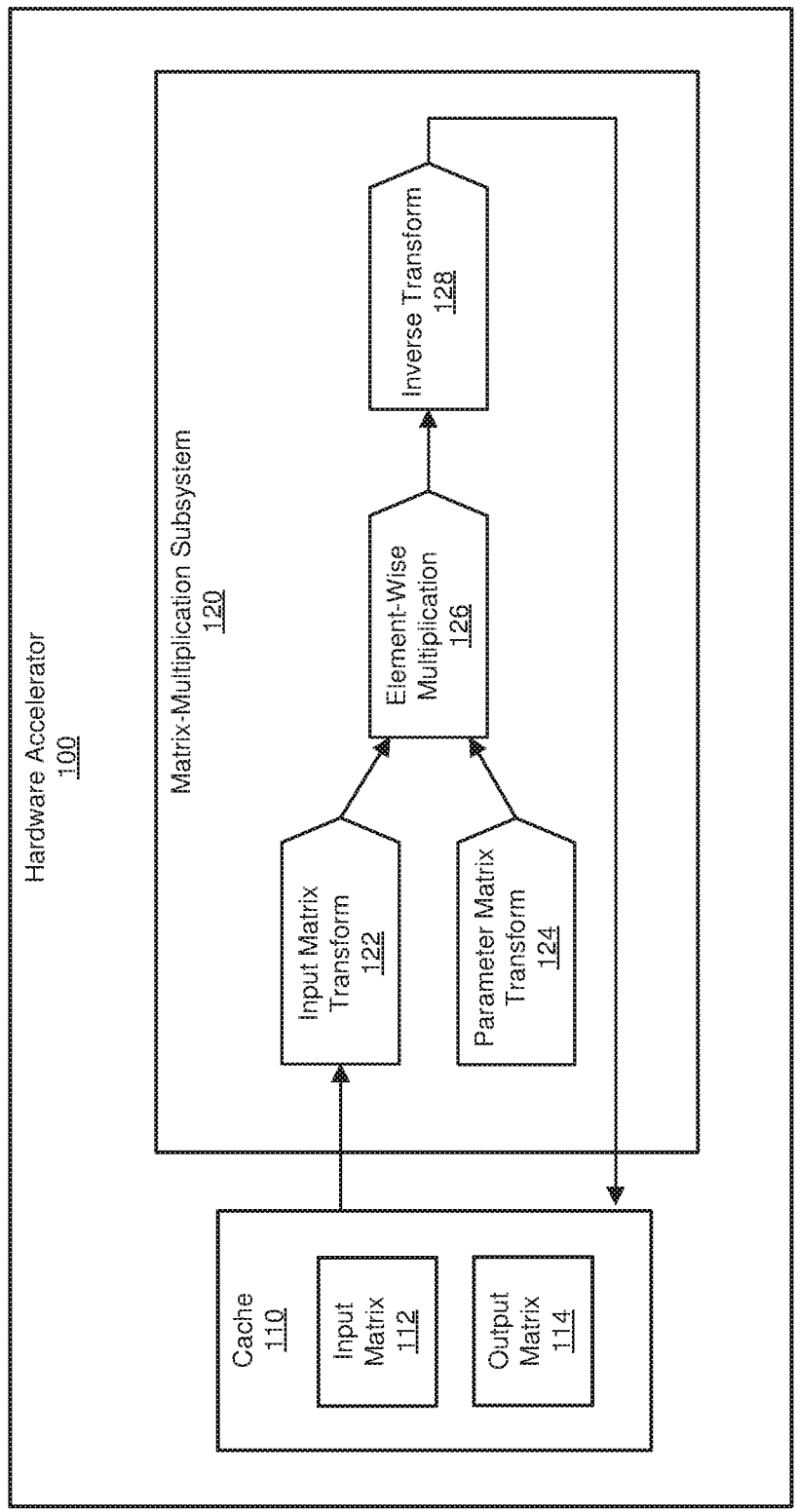
FIG. 1 is a block diagram of an exemplary special-purpose hardware accelerator capable of using pre-configured coefficients to perform the domain-transform operations used in modern convolution operations.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The instant disclosure is generally directed to a special-purpose hardware accelerator (and computing system incorporating the same) that has been pre-configured or hard-coded with the coefficients used to perform some or all of the domain-transform operations typically used in modern convolution algorithms, such as the Winograd minimal filtering algorithm. As will be explained in greater detail below, hardware accelerators pre-configured in this manner may provide a number of features and advantages over traditional systems. For example, by using pre-configured or hardcoded coefficients instead of storing the same in what is often valuable and/or expensive memory (both from a price and a performance perspective), the pre-configured, specialized hardware disclosed herein may, in addition to reducing the overall number of arithmetic operations required to perform a convolution operation, accelerate convolution computation, reduce memory usage, reduce energy consumption and heat generation, lower costs, and/or provide a number of other benefits.

Figure 2:
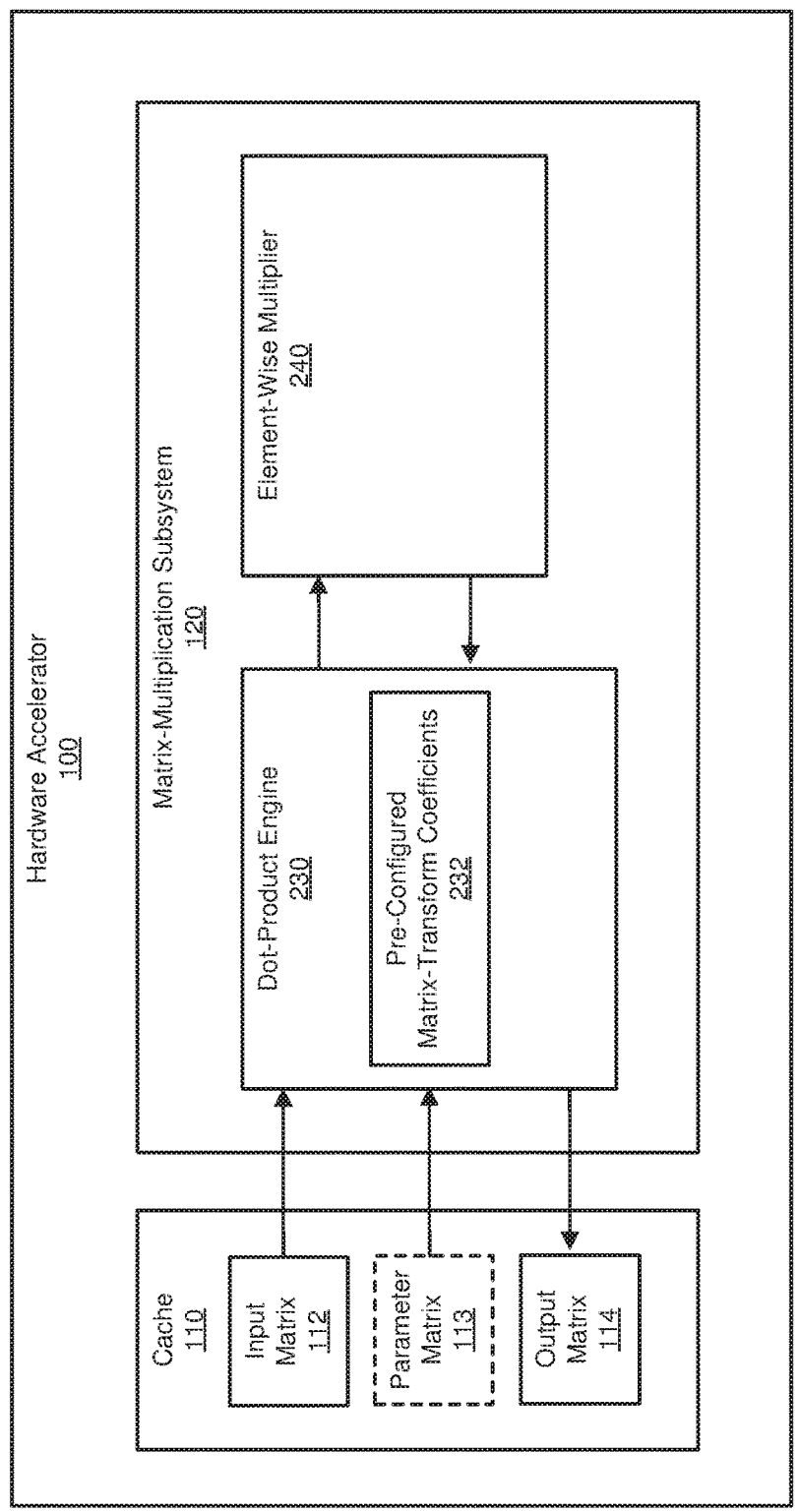
FIG. 2 is an additional illustration of the hardware accelerator from FIG. 1.

The following will provide, with reference to FIGS. 1 and 2, detailed descriptions of an exemplary special-purpose hardware accelerator pre-configured with the coefficients used to perform the matrix-transform operations used in modern convolution operations. The description corresponding to FIGS. 3-8 will detail an exemplary method for performing convolution operations using such accelerators.

Figure 9:
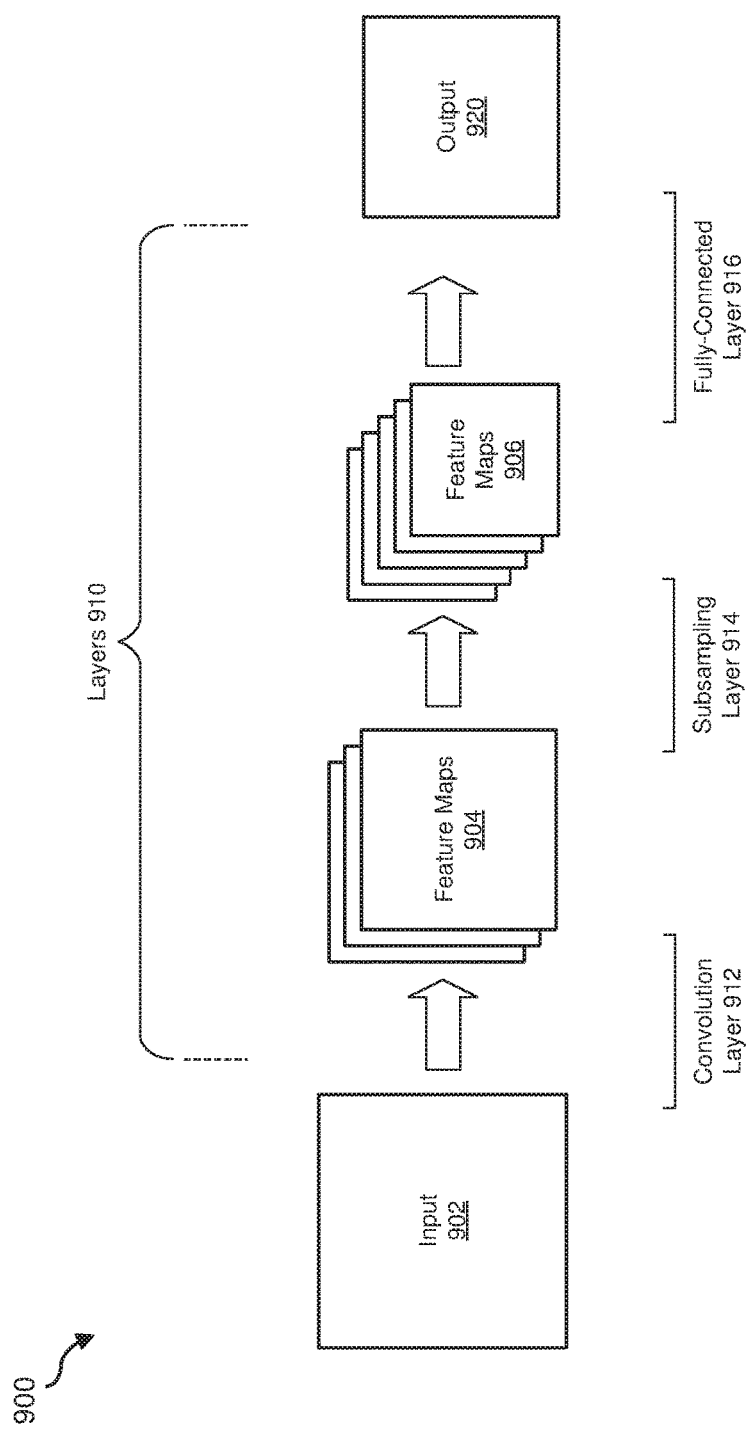
FIG. 9 is a block diagram of an exemplary convolutional neural network capable of benefiting from the hardware accelerators of FIGS. 1 and 2.

In addition, a detailed description of an exemplary convolutional neural network capable of benefiting from the hardware accelerators described herein will be provided in connection with FIG. 9. Finally, the description corresponding to FIGS. 10-11 will detail an exemplary server and computing system capable of incorporating the disclosed hardware accelerators.

Turning to the figures, FIGS. 1 and 2 illustrate an exemplary special-purpose hardware accelerator 100. The term "special-purpose hardware accelerator" may, in some examples, refer to various types and forms of processors, logical units, and other hardware elements that may be arranged, designed, or otherwise configured to perform one or more tasks more efficiently than general-purpose computing systems (e.g., general-purpose processors and/or memory devices). For example, some of the special-purpose hardware accelerators described herein may be configured to perform convolution operations more efficiently and/or more effectively than general-purpose central processing units (CPUs). Special-purpose hardware accelerators may be implemented in a variety of ways, including via hardwiring and/or using application-specific integrated circuits (ASICs) or field-programmable gate arrays (FPGAs).

As illustrated in FIG. 1, hardware accelerator 100 may include a cache 110 and a matrix-multiplication subsystem 120. Cache 110 generally represents any type or form of volatile or non-volatile storage device or medium capable of storing data and/or computer-readable instructions, such as the filter weights and/or input/output data used or generated during convolution operations. Examples of cache 110 include, without limitation, static random-access memory (SRAM), Random Access Memory (RAM), Read Only Memory (ROM), flash memory, Hard Disk Drives (HDDs), Solid-State Drives (SSDs), variations or combinations of one or more of the same, or any other suitable storage device.

In one example, cache 110 may be configured to store an input matrix (such as input matrix 112) related to performing a convolution operation. In one example, this convolution operation may correspond to a machine-learning task, such as a computer-vision task that uses convolution operations to identify objects in images, although this convolution operation may also correspond to computing tasks that are unrelated to AI or machine-learning tasks. The convolution operations described herein may be applied to various types of inputs, which may be referred to as "input volumes" or "input matrices." Input volumes may correspond to any type or form of data capable of being convolved, including image data, speech data, video data, etc. Input volumes may also correspond to one or more inputs and, thus, may represent one-dimensional inputs, two-dimensional inputs, three-dimensional inputs, etc. For example, an input volume may correspond to a two-dimensional image having three channels, such as red, green, and blue, and may therefore be considered three-dimensional.

Figure 5:
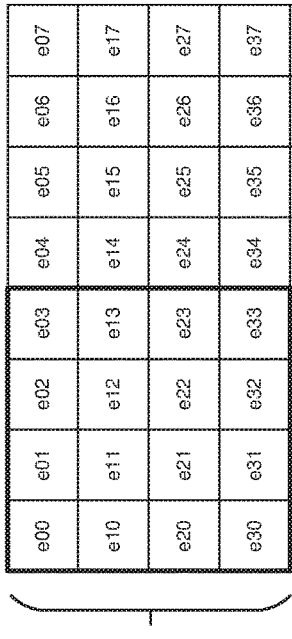
FIG. 5 is a block diagram of the input matrix transformed in FIG. 4.
Figure 6:
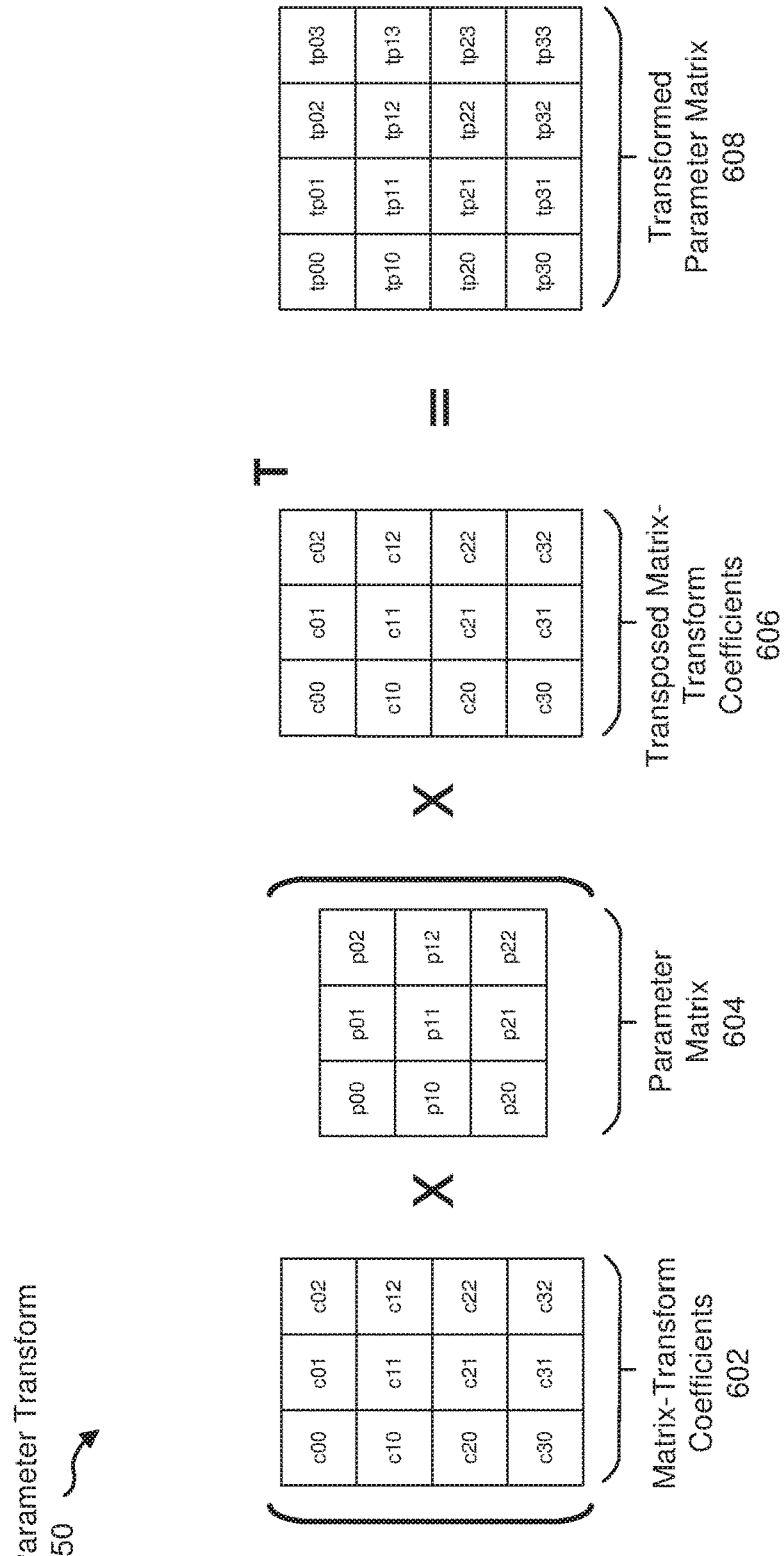
FIG. 6 is a process diagram illustrating an exemplary parameter matrix transform operation.
Figure 7:
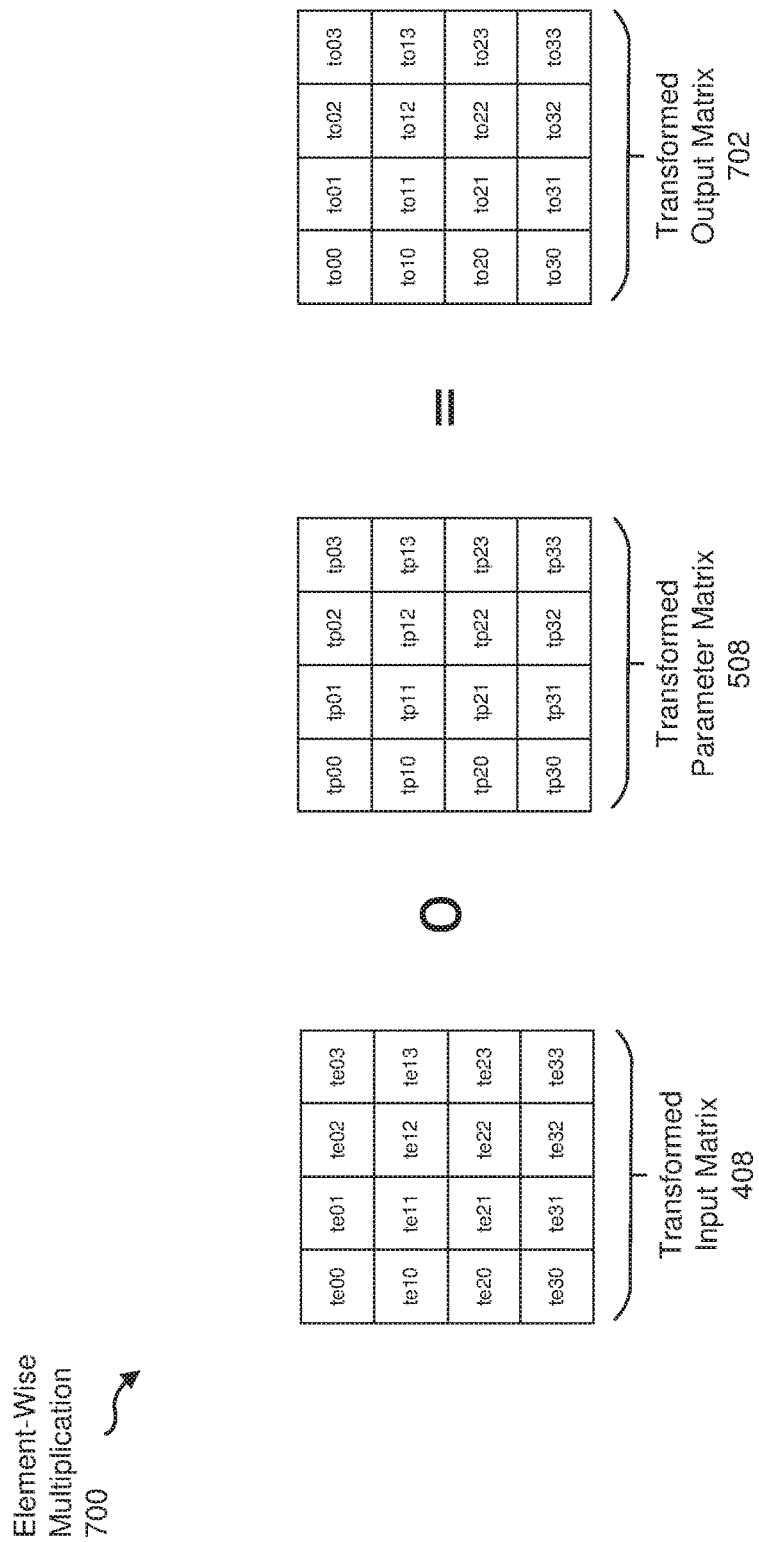
FIG. 7 is a process diagram illustrating the performance of an exemplary element-wise multiplication operation on the input and parameter matrices transformed in FIGS. 4 and 6.
Figure 8:
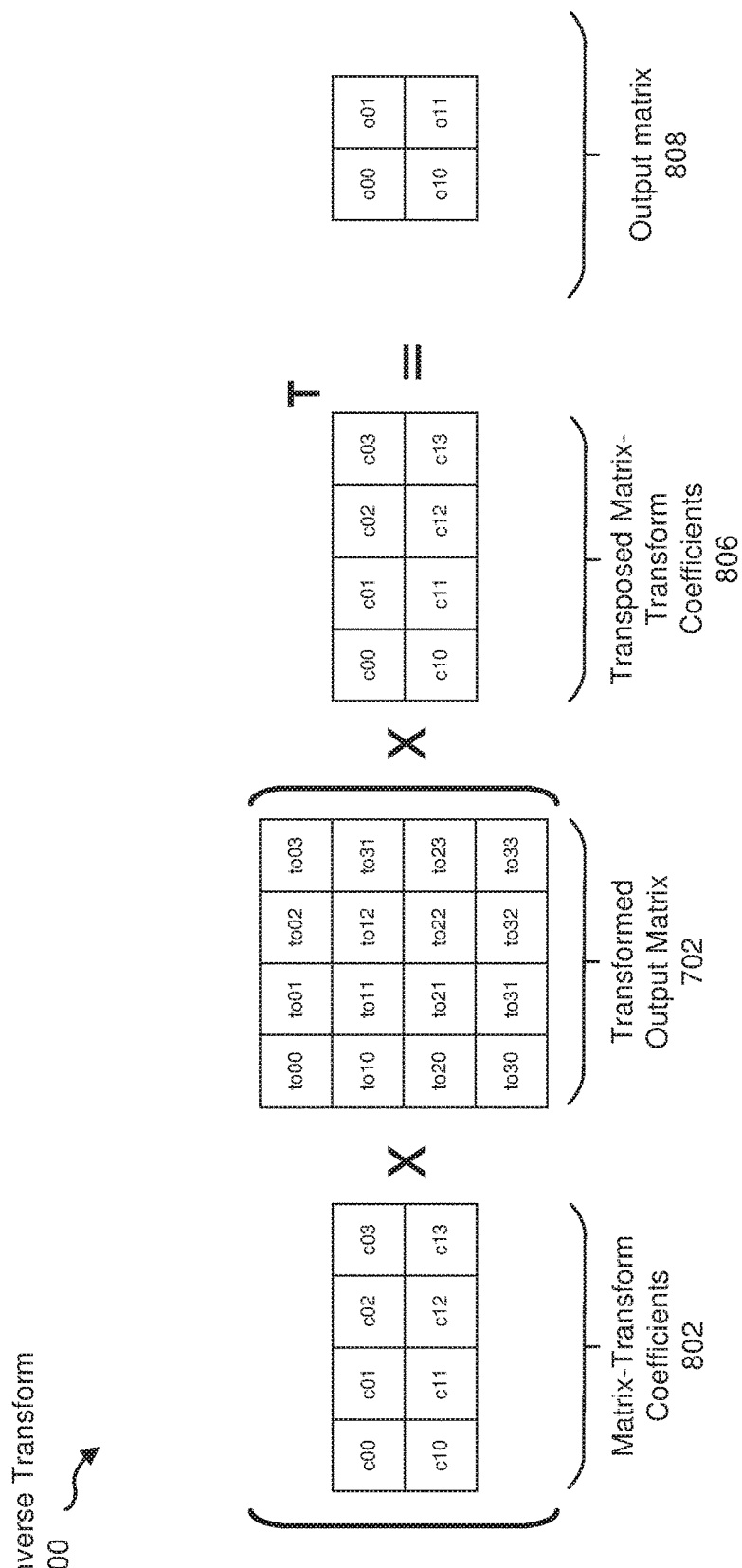
FIG. 8 is a process diagram illustrating an exemplary inverse-transform operation performed on the results of the element-wise multiplication operation performed in FIG. 7.

Input matrices (such as input matrix 112) may represent either a subset or the entirety of an input volume. For example, an input matrix of a 3D input volume may be a smaller matrix (such as a patch or a tile) taken from one or more channels of the 3D input volume. Specifically, as illustrated in FIG. 5, input matrix 404 may represent a subset or a portion of an input volume 500 that corresponds to a convolution operation (such as pixels from an input image selected based on a filter or parameter window). In other examples, input matrix 112 may represent the entirety of an input volume.

In some examples, cache 110 may also be configured to store a parameter matrix 113 that includes convolution parameters for performing a convolution operation. Examples of parameter matrix 113 include, without limitation, filter or weight matrices derived by training a neural network. As with input matrix 112, parameter matrix 113 may represent a one-dimensional, two-dimensional, or three-dimensional matrix.

Matrix-multiplication subsystem 120 generally represents any type or form of matrix calculation hardware capable of performing arithmetical operations, such as those performed during convolution operations. In some examples, matrix-multiplication subsystem 120 may be made up of a number of discrete units, such as one or more general matrix-to-matrix multiplication (GEMM) units, multiply-accumulate (MAC) units, etc. In the example illustrated in FIG. 2, matrix-multiplication subsystem 120 may include at least one dot-product engine 230 and at least one element-wise multiplier 240.

In some examples, matrix-multiplication subsystem 120 may be pre-configured with matrix-transform coefficients for performing matrix-transform operations. The term "matrix-transform operation" may, in some examples, refer to the operations used by some modern convolution algorithms to transform data and/or operations into a more efficient (i.e., less complex, from an arithmetic perspective) domain, such as transforming a time-domain operation into a frequency-domain operation or a so-called Winograd-domain operation. In some examples, such as during Winograd minimal filtering convolutions, these operations may involve transforming (using, e.g., matrix multiplication) an input matrix and/or a parameter matrix (such as a filter map) using a matrix of pre-determined (and often constant or unchanging) coefficients, such as 0, 1, −1, 0.5, etc., referred to herein as "matrix-transform coefficients." A more in-depth discussion of these coefficients, as wells as methods for calculating the same, may be found in "Fast Algorithms for Convolutional Neural Networks" by Andrew Lavin and Scott Gray, Proceedings of the IEEE Conference on Computer Vision and Pattern Recognition, 2016, pp. 4013-4021 (hereafter "Lavin and Gray"), the entirety of which is hereby incorporated by reference.

Unfortunately, storing these matrix-transform coefficients to, and reading such coefficients from, memory may consume precious (and often expensive) resources, potentially resulting in decreased performance, increased power usage, and wasted memory space. In one example, hardware accelerator 100 may avoid these issues by being pre-configured or hardcoded with the matrix-transform coefficients that are used to perform the above-described transformations. Matrix-multiplication subsystem 120 may be pre-configured with matrix-transform coefficients in a variety of ways, including via hardwiring and/or using ASICs or FPGAs. For example, and as illustrated in FIG. 2, dot-product engine 230 (which may, in some examples, perform the matrix-multiplication operations required to transform input matrix 112 and parameter matrix 113) may be pre-configured with matrix-transform coefficients 232. In this example, matrix-transform coefficients 232 may be fixed or hardcoded (via, e.g., hardwiring and/or via an ASIC or FPGA design) within the architecture of dot-product engine 230 itself (e.g., one or more of the inputs of dot-product engine 230 may be fixed or hardcoded to the values of matrix-transform coefficients 232), thereby eliminating the need to store or read such coefficients from cache 110 (or any other memory device within or external to hardware accelerator 100).

Matrix-transform coefficients 232 may represent some or all of the coefficients used to perform the matrix-transform operations mentioned above. Matrix-transform coefficients 232 may also represent the coefficients required by a single or a plurality of matrix-transform operations. For example, matrix-transform coefficients 232 may include pre-configured coefficients for transforming an input matrix (e.g., input matrix 112), pre-configured coefficients for transforming a parameter matrix (e.g., parameter matrix 113), and/or pre-configured coefficients for performing inverse-transformation operations on the results of an element-wise multiplication operation performed on the transformed input and parameter matrices (described in greater detail below). In some examples, matrix-transform coefficients 232 may also include transposed versions of one or more such coefficients, such as a transposed version of the pre-configured coefficients for transforming the input matrix, a transposed version of the pre-configured coefficients for transforming the parameter matrix, and/or a transposed version of the pre-configured coefficients for performing the above-mentioned inverse-transformation operations. In other examples, however, matrix-multiplication subsystem 120 may directly transpose matrix-transform coefficients 232 using in-place matrix transposition, thereby eliminating the need to pre-configure or hardcode matrix-multiplication subsystem 120 with transposed versions of the above-described coefficients.

Figure 3:
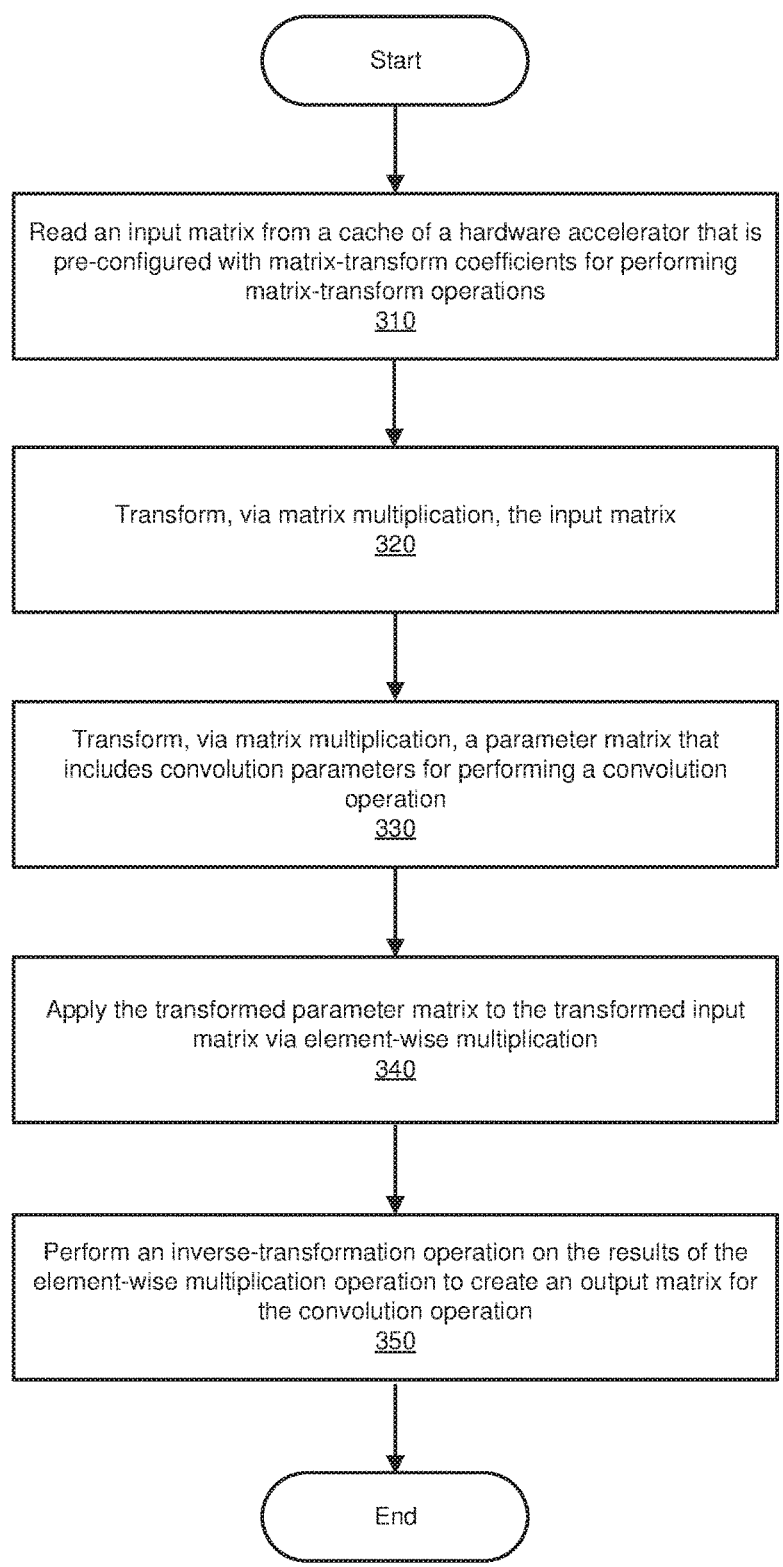
FIG. 3 is a flow diagram of an exemplary method for performing convolution operations using a special-purpose hardware accelerator with pre-configured matrix-transform coefficients.
Figure 4:
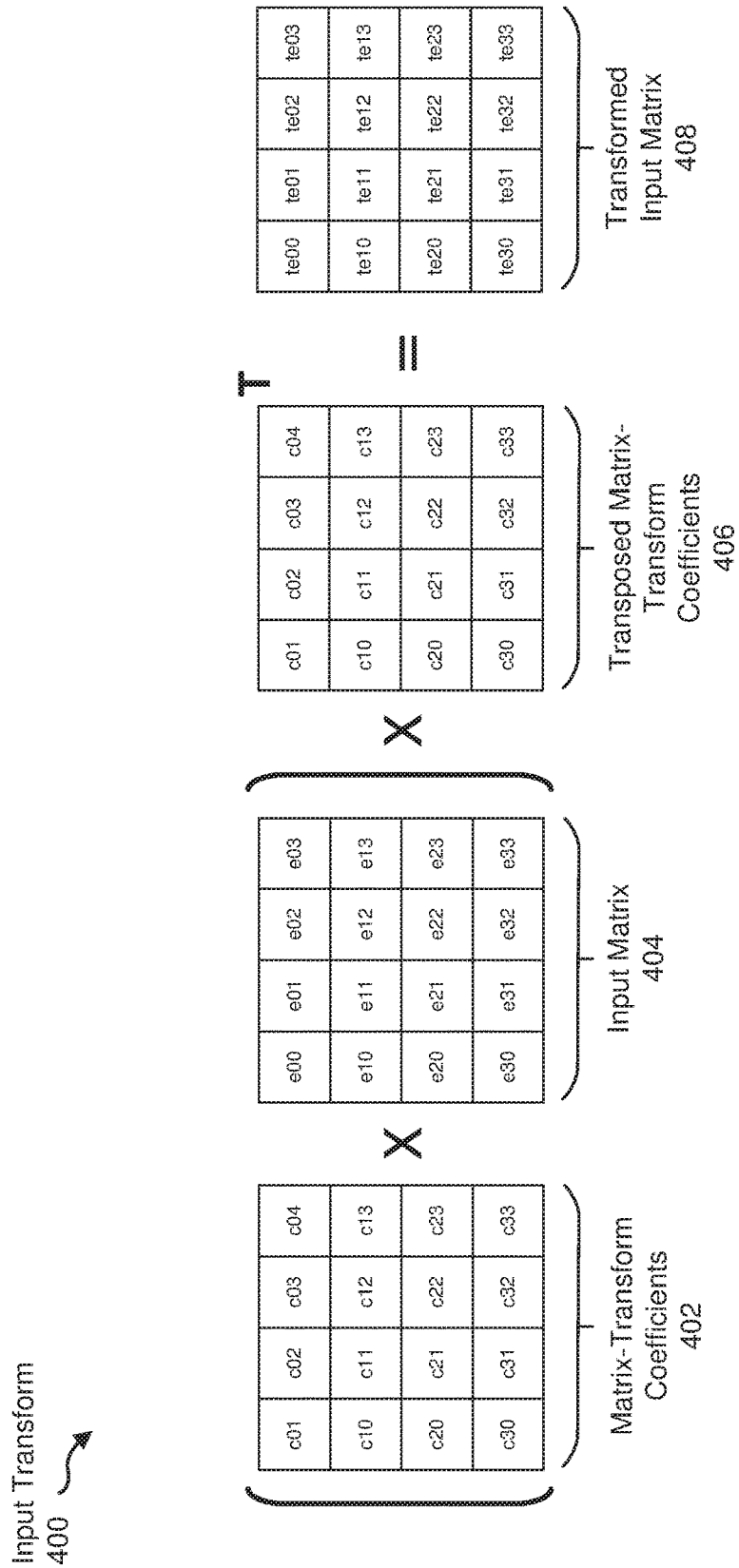
FIG. 4 is a process diagram illustrating an exemplary input matrix transform operation.

By pre-configuring hardware accelerator 100 with the matrix-transform coefficients used to perform the matrix-transform operations required by modern convolution algorithms (such as the Winograd minimal filtering algorithm), hardware accelerator 100 may be able to perform the convolution operations used by such algorithms in an energy and space-efficient manner. FIG. 3 is a flow diagram of an exemplary computer-implemented method 300 for using hardware accelerator 100 to perform such convolution operations. The steps shown in FIG. 3 may be performed by any suitable computer-executable code and/or computing system, including the system(s) illustrated in FIGS. 1, 2, 9, and 12. In one example, each of the steps shown in FIG. 3 may represent an algorithm whose structure includes and/or is represented by multiple sub-steps, examples of which will be provided in greater detail below.

As illustrated in FIG. 3, at step 310 the systems described herein may read an input matrix from a cache of a hardware accelerator that is pre-configured with matrix-transform coefficients for performing matrix-transform operations. For example, and as illustrated in FIGS. 1 and 2, matrix-multiplication subsystem 120 (which may be pre-configured with matrix-transform coefficients 232) may read input matrix 112 from cache 110.

At step 320, the systems described herein may transform the input matrix via matrix multiplication. For example, matrix-multiplication subsystem 120 may transform, using a matrix-multiplication operation, input matrix 112 into a less-complex (from an arithmetic perspective) domain (e.g., a domain that facilitates element-wise multiplication operations, as detailed below), as represented by input matrix transform 122 in FIG. 1.

The systems described herein may perform step 320 in a variety of ways. In one example, dot-product engine 230 may use the pre-configured matrix-transform coefficients 232 to transform input matrix 112 via a matrix-multiplication operation. For example, and as shown by input transform 400 illustrated in FIG. 4, dot-product engine 230 may multiply an input matrix 404 by a set of matrix-transform coefficients 402. Dot-product engine 230 may then multiply the results of the prior operation by a transposed version of matrix-transform coefficients 402 (e.g., transposed matrix-transform coefficients 406), resulting in transformed input matrix 408. As detailed above, matrix-transform coefficients 402 may be pre-determined and/or pre-selected in a variety of ways based on a variety of factors (including those outlined in the Lavin and Gray paper previously identified and incorporated herein).

In some examples, the systems described herein may transform an input matrix on-the-fly when reading the same from memory. For example, because matrix-multiplication subsystem 120 may be pre-configured or hardcoded with matrix-transform coefficients 402 (and/or transposed versions of the same), matrix-multiplication subsystem 120 may transform input matrix 112 as it reads the same from cache 110 via dot-product engine 230.

In one example, this on-the-fly transformation may (due to, e.g., the input parameters or size of matrix-multiplication subsystem 120 and/or various discrete units within the same) result in the performance of multiple transformation operations on a given input volume or channel. In this example, step 320 may include receiving an initial portion of the input volume (e.g., input matrix 404 in FIG. 5) from cache 110 and then transforming the initial portion of the input volume via matrix multiplication. Additional or subsequent portions of the input volume may then be read and transformed either in parallel or upon completion of the process flow outlined in FIG. 3.

In other examples, matrix-multiplication subsystem 120 may transform the entirety of an input volume or channel a single time and then store the results of the same in cache 110. In these examples, when the input volume is to be retrieved for a subsequent convolution, the transformed input stream may be retrieved instead.

At step 330, the systems described herein may transform, via matrix multiplication, a parameter matrix that includes convolution parameters for performing a convolution operation. For example, matrix-multiplication subsystem 120 may transform parameter matrix 113 (which may, as detailed above, represent a filter map or weight matrix determined by training a neural network) using a matrix-multiplication operation, as represented by parameter matrix transform 124 in FIG. 1.

The systems described herein may perform step 330 in a variety of ways. In one example, dot-product engine 230 may use the pre-configured matrix-transform coefficients 232 to transform parameter matrix 113. For example, and as shown by parameter transform 650 illustrated in FIG. 6, dot-product engine 230 may multiply a parameter matrix 604 by a set of matrix-transform coefficients 602. Dot-product engine 230 may then multiply the results of the prior operation by a transposed version of matrix-transform coefficients 602 (e.g., transposed matrix-transform coefficients 606), resulting in transformed input matrix 608. As detailed above, matrix-transform coefficients 602 may be pre-determined and/or pre-selected in a variety of ways based on a variety of factors (including those outlined in the Lavin and Gray paper previously identified and incorporated herein).

As with input matrix 112, in some examples the systems described herein may transform a parameter matrix on-the-fly when reading the same from memory. For example, because matrix-multiplication subsystem 120 may be pre-configured or hardcoded with matrix-transform coefficients 602 (and/or transposed versions of the same), matrix-multiplication subsystem 120 may transform parameter matrix 113 as it reads the same from cache 110 via dot-product engine 230.

At step 340, the systems described herein may apply the transformed parameter matrix to the transformed input matrix via element-wise multiplication. For example, matrix-multiplication subsystem 120 may apply, via an element-wise multiplication operation, the transformed parameter matrix from step 330 to the transformed input matrix from step 320, as represented by element-wise multiplication 126 in FIG. 1. The term "element-wise multiplication" may, in some examples, refer to a binary operation that takes two matrices of the same dimension as an input (such as the transformed input and parameter matrices from steps 320 and 330) and produces, as an output, another matrix in which each element is the product of corresponding elements from the original matrices.

As detailed above, time-domain convolutions (in which an input matrix is convolved with a parameter matrix) traditionally require numerous arithmetic operations, such as dot-product operations iterated across matrix elements. As the sizes of the input volumes and/or the number of convolution layers within a neural network increase, these convolutions may require significant processing resources. By transforming input matrix 112 and parameter matrix 113 into a different domain (e.g., the frequency domain or the so-called Winograd domain), however, matrix-multiplication subsystem 120 may reduce the convolution of input matrix 112 and parameter matrix 113 into a simplified element-wise multiplication operation in which corresponding elements of matrices are multiplied together, resulting in fewer overall arithmetic operations. Element-wise multiplication operations may also take advantage of hardware, such as GEMM units or other matrix multiplication units within matrix-multiplication subsystem 120, designed to efficiently perform such operations.

The systems described herein may perform step 340 in a variety of ways. For example, and as shown by element-wise multiplication 700 illustrated in FIG. 7, element-wise multiplier 240 may multiply, using element-wise multiplication, transformed input matrix 408 by transformed parameter matrix 508, resulting in transformed output matrix 702. As detailed above, the domain-transformation operations performed by dot-product engine 230 in steps 320 and 330 may enable element-wise multiplier 240 to perform a relatively straightforward element-wise multiplication operation in step 340, which may in turn reduce the total number of arithmetic operations required to convolve input matrix 112 and parameter matrix 113.

At step 350, the systems described herein may perform an inverse-transformation operation on the results of the element-wise multiplication operation to create an output matrix for the convolution operation. For example, matrix-multiplication subsystem 120 may perform an inverse-transformation operation on the results of step 340 to create an output matrix 114, as represented by inverse transform 128 in FIG. 1.

As detailed above, the results of step 340 may represent a domain-transformed convolution of input matrix 112 and parameter matrix 113. In order to return this domain-transformed convolution to the time-domain, matrix-multiplication subsystem 120 may perform an inverse-transformation operation on the same, resulting in output matrix 114. The convolution operations described herein may produce a variety of outputs, which may be referred to as "output volumes" or "output matrices." In some examples, the terms "output volume" or "output matrix" may refer to a transformed input volume or matrix, such as the result of convolving an input matrix with a parameter matrix. As with input volumes, output volumes may include one-dimensional outputs, two-dimensional outputs, three-dimensional outputs, etc. In addition, output matrix 114 may represent either a subset or the entirety of an output volume.

The systems described herein may perform step 350 in a variety of ways. In one example, dot-product engine 230 may use the pre-configured matrix-transform coefficients 232 to perform an inverse-transformation operation on the results of step 340. For example, and as shown by inverse transform 800 illustrated in FIG. 8, dot-product engine 230 may multiply transformed output matrix 702 (from step 340) by a set of matrix-transform coefficients 802. Dot-product engine 230 may then multiply the results of the prior operation by a transposed version of matrix-transform coefficients 802 (e.g., transposed matrix-transform coefficients 806), resulting in output matrix 808. As detailed above, matrix-transform coefficients 802 may be pre-determined and/or pre-selected in a variety of ways based on a variety of factors (including those outlined in the Lavin and Gray paper previously identified and incorporated herein).

Similar to steps 320 and 330, in some examples the systems described herein may, in step 350, perform an inverse transformation operation on transformed output matrix 702 on-the-fly when storing the same to memory. For example, because matrix-multiplication subsystem 120 may be pre-configured or hardcoded with matrix-transform coefficients 802 (and/or transposed versions of the same), matrix-multiplication subsystem 120 may transform the results of step 340 back into the time domain as it stores the same to cache 110 via dot-product engine 230. Upon completion of step 350, the process flow of method 300 in FIG. 3 may terminate.

As detailed above, the systems described herein may use pre-configured matrix-transform coefficients to perform one or more of the transform or inverse-transform operations described herein. In one example, matrix-multiplication subsystem 120 may be pre-configured with a single set of matrix-transform coefficients (e.g., one of matrix-transform coefficients 402, 602, or 802). In other examples, matrix-multiplication subsystem 120 may be pre-configured with multiple or all possible matrix-transform coefficients. As such, matrix-multiplication subsystem 120 may be pre-configured with matrix-transform coefficients sufficient to transform one or more input matrices, transform one or more parameter matrices, inverse-transform one or more element-wise multiplication operations, and/or any possible variation or combination of the same.

In some examples, matrix-multiplication subsystem 120 may include a discrete unit dedicated to each transformation (or inverse-transformation) operation described herein. For example, matrix-multiplication subsystem 120 may include at least one GEMM or other matrix-multiplication unit dedicated to performing input-matrix transforms (hardcoded, e.g., with the matrix-transform coefficients used to transform input matrices), at least one GEMM or other matrix-multiplication unit dedicated to performing parameter-matrix transforms (hardcoded, e.g., with the matrix-transform coefficients used to transform parameter matrices), and/or at least one GEMM or other matrix-multiplication unit dedicated to performing inverse-transform operations (hardcoded, e.g., with the matrix-transform coefficients used to perform inverse-transform operations).

In certain implementations, matrix-multiplication subsystem 120 may include a plurality of GEMMs or other matrix-multiplication units, each of which may be pre-configured or hardcoded with a discrete set of matrix-transform coefficients corresponding to a particular volume or channel. Such a configuration may, in turn, enable matrix-multiplication subsystem 120 to perform a plurality of transformations in parallel, potentially resulting in increased computing performance and/or a reduction in memory or power usage.

In some examples, one or more of the transformation operations described herein may be stored in memory for reuse in subsequent convolution operations. For example, since a single parameter or filter matrix is often applied multiple times to a given input volume (e.g., when applying a sliding filter window to an input volume), matrix-multiplication subsystem 120 may store the transformed parameter matrix in cache 110 so that, in future convolution operations involving the parameter matrix, matrix-multiplication subsystem 120 (e.g., element-wise multiplier 240) can read the transformed parameter matrix directly from cache 110 instead of again transforming the parameter matrix. Matrix-multiplication subsystem 120 may take a similar approach with an input matrix to which multiple parameter matrices are to be applied. By storing transformed input and parameter matrices in this manner, the systems described herein may amortize the computing cost associated with transforming such matrices across multiple convolution operations, potentially limiting the overhead cost or impact of the same against any single convolution operation.

Since, as detailed above, the same transformations are often reused across multiple convolution operations, in one example the systems described herein may batch multiple element-wise multiplication operations as a single matrix-multiplication operation in order to optimize the utilization of the discrete units within hardware accelerator 100. For example, when processing multiple input/parameter matrix combinations, hardware accelerator 100 may (1) pose each element-wise multiplication of an input/parameter matrix pair (such as the results of step 340) as a dot-product operation (using, e.g., one or more Basic Linear Algebra Subprograms (BLAS) or sequences, such as BLAS1>BLAS2>BLAS3) and then (2) batch a plurality of such dot-product operations together into a larger matrix-multiplication operation for processing by matrix-multiplication subsystem 120. By processing multiple input matrices simultaneously in this manner, hardware accelerator 100 may more efficiently utilize cache 110 and/or the various units of matrix-multiplication subsystem 120, potentially resulting in increased computing performance and/or a reduction in memory or power usage.

As detailed above, the hardware accelerators and computing systems disclosed herein may provide a number of features and advantages over traditional systems. For example, the pre-configured, specialized hardware discussed above may, in addition to reducing the overall number of arithmetic operations required to perform a convolution operation, accelerate convolution computation, reduce memory usage, reduce energy consumption and heat generation, lower costs, and/or provide a number of other benefits.

The hardware accelerators detailed above may enable computing systems to realize the above-described benefits across a wide variety of computing tasks and workloads, including machine learning. FIG. 9 is a block diagram of an exemplary neural network 900 that may benefit from the hardware accelerators disclosed herein. As shown in FIG. 9, neural network 900 may include a variety of different types of layers 910. In convolution layer 912, an input 902 may undergo convolutional transformations, which may be calculated by hardware such as hardware accelerator 100 in FIGS. 1 and 2, server 1006 in FIG. 10, and/or computing system 1110 in FIG. 11. For example, input 902 may undergo convolutions based on the filters and quantization parameters of convolution layer 912 to produce feature maps 904. In some embodiments, convolution layer 912 may also include a rectification sublayer (e.g., a rectified linear unit, or RELU) with an activation function.

FIG. 9 also shows that feature maps 904 output by convolution layer 912 may undergo subsampling (e.g., pooling), based on the filters and parameters of subsampling layer 914, to produce feature maps 906, which may be reduced-size feature maps. The convolution and subsampling of layers 912 and 914 may be performed a single time or multiple times before sending an output (e.g., feature maps 906) to a fully connected layer, such as fully connected layer 916. Fully connected layer 916 may then process feature maps 906 to identify the most probable inference or classification for input 902 and may provide this classification or inference as output 920. In some examples, the hardware accelerators described herein may enable all or some of layers 910 within neural network 900 to be computed faster and/or more efficiently, leading to the performance benefits and/or energy savings detailed above.

Figure 10:
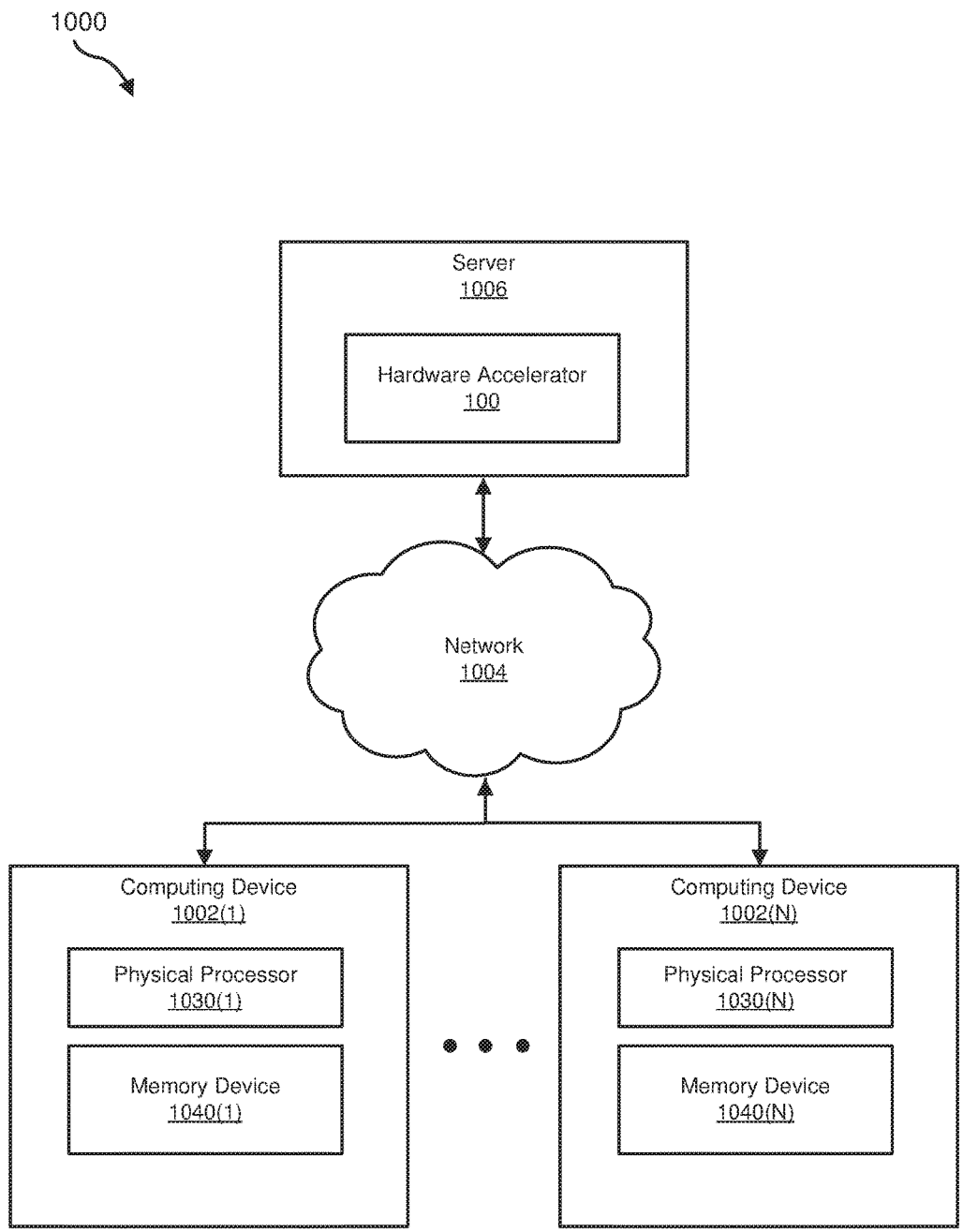
FIG. 10 is a block diagram of an exemplary system in which the hardware accelerators of FIGS. 1 and 2 may be implemented.

FIG. 10 illustrates an exemplary network environment 1000 (such as a social network environment) in which aspects of the present disclosure may be implemented. As shown, network environment 1000 may include a plurality of computing devices 1002(1)-(N), a network 1004, and a server 1006. In one example, server 1006 may host a social network or may be part of a system that hosts a social network. In this example, server 1006 may include one or more of the hardware accelerators described herein, such as hardware accelerator 100.

Computing devices 1002(1)-(N) may each represent a client device or a user device, such a desktop computer, laptop computer, tablet device, smartphone, or other computing device. Each of computing devices 1002(1)-(N) may include a physical processor (e.g., physical processors 1030(1)-(N)), which may represent a single processor or multiple processors, and a memory device (e.g., memory devices 1040(1)-(N)), which may store instructions (e.g., software applications) or data.

Computing devices 1002(1)-(N) may be communicatively coupled to server 1006 through network 1004. Network 1004 may be any communication network, such as the Internet, a Wide Area Network (WAN), or a Local Area Network (LAN), and may include various types of communication protocols and physical connections.

As noted, server 1006 may host a social network, and in such embodiments, computing devices 1002(1)-(N) may each represent an access point (e.g., an end-user device) for the social network. In some examples, a social network may refer to any type or form of service that enables users to connect through a network, such as the Internet. Social networks may enable users to share various types of content, including web pages or links, user-generated content such as photos, videos, posts, and/or to make comments or message each other through the social network.

In some embodiments, server 1006 may access data (e.g., data provided by computing devices 1002(1)-(N)) for analysis. For example, server 1006 may perform (using, e.g., hardware accelerator 100) various types of AI or machine-learning tasks on data. For instance, server 1006 may use AI or machine-learning algorithms to rank feeds and search results, to identify spam, pornography, and/or other misleading content, to perform speech recognition (e.g., to automatically caption videos), to automate translation from one language to another, to enable natural language processing, to enable computer vision (e.g., to identify objects in images, to turn panoramic photos into interactive 360 images, etc.), and/or to perform a variety of other tasks. In one example, by incorporating one or more of the hardware accelerators described herein (e.g., hardware accelerator 100), server 1006 may, when performing such tasks, realize the performance benefits and/or energy savings detailed above.

Embodiments of the instant disclosure may also be applied to various environments in addition to or instead of social networking environments. For example, the systems and methods disclosed herein may be used in video game development and game play (e.g., in reinforcement-learning techniques), to automate robotics tasks (e.g., grasping, stabilization, navigation, etc.), in medical research (e.g., genomics, cancer research, etc.), for autonomous vehicle navigation, and/or in any other suitable context.

In addition to being applied in a variety of technical fields, embodiments of the instant disclosure may also be applied to numerous different types of neural networks. For example, the systems and methods described herein may be implemented in any AI scheme that is designed to provide brain-like functionality via artificial neurons. In some examples (e.g., recurrent neural networks and/or feed-forward neural networks), these artificial neurons may be non-linear functions of a weighted sum of inputs that are arranged in layers, with the outputs of one layer becoming the inputs of a subsequent layer. In addition, while some off the examples herein are discussed in the context of AI hardware accelerators, aspects of the present disclosure may also be applied to other hardware processing systems in which convolution operations are required or useful.

Figure 11:
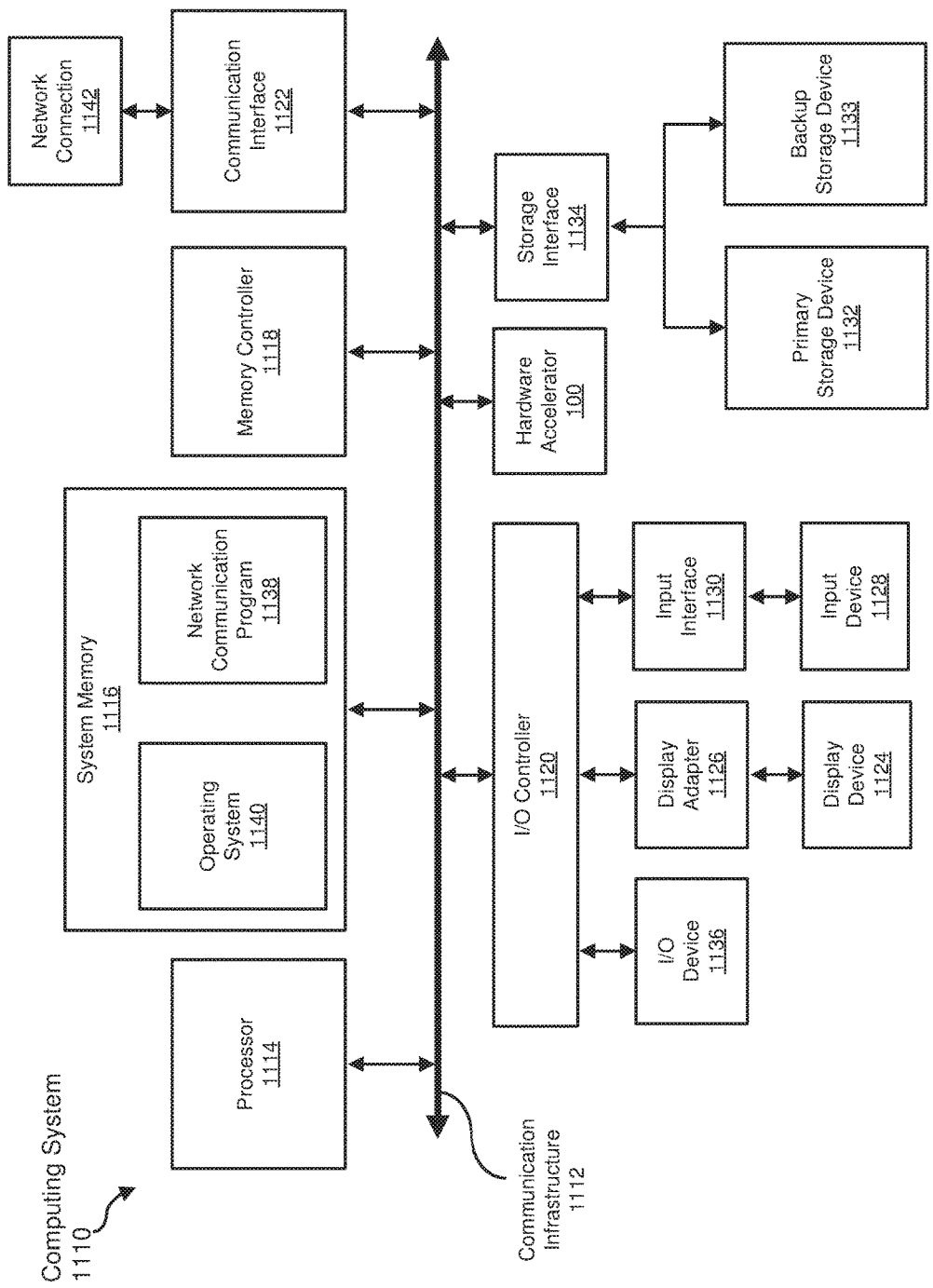
FIG. 11 is a block diagram of an exemplary computing system in which the hardware accelerators of FIGS. 1 and 2 may be implemented.

As detailed above, the computing devices and systems described and/or illustrated herein broadly represent any type or form of computing device or system capable of executing computer-readable instructions. FIG. 11 is a block diagram of an exemplary computing system 1110 capable of incorporating and/or implementing one or more of the embodiments described and/or illustrated herein. Computing system 1110 broadly represents any single or multi-processor computing device or system capable of executing computer-readable instructions. Examples of computing system 1110 include, without limitation, workstations, laptops, client-side terminals, servers, distributed computing systems, handheld devices, or any other computing system or device. In its most basic configuration, computing system 1110 may include at least one processor 1114, a system memory 1116, and one or more of the hardware accelerators described herein, such as hardware accelerator 100.

Processor 1114 generally represents any type or form of physical processing unit (e.g., a hardware-implemented central processing unit) capable of processing data or interpreting and executing instructions. In certain embodiments, processor 1114 may receive instructions from a software application or module. These instructions may cause processor 1114 to perform the functions of one or more of the exemplary embodiments described and/or illustrated herein.

System memory 1116 generally represents any type or form of volatile or non-volatile storage device or medium capable of storing data and/or other computer-readable instructions. Examples of system memory 1116 include, without limitation, Random Access Memory (RAM), Read Only Memory (ROM), flash memory, or any other suitable memory device. Although not required, in certain embodiments computing system 1110 may include both a volatile memory unit (such as, for example, system memory 1116) and a non-volatile storage device (such as, for example, primary storage device 1132, as described in detail below).

In some examples, system memory 1116 may store and/or load an operating system 1140 for execution by processor 1114. In one example, operating system 1140 may include and/or represent software that manages computer hardware and software resources and/or provides common services to computer programs and/or applications on computing system 1110.

In certain embodiments, exemplary computing system 1110 may also include one or more components or elements in addition to processor 1114 and system memory 1116. For example, as illustrated in FIG. 11, computing system 1110 may include a memory controller 1118, an Input/Output (I/O) controller 1120, and a communication interface 1122, each of which may be interconnected via a communication infrastructure 1112. Communication infrastructure 1112 generally represents any type or form of infrastructure capable of facilitating communication between one or more components of a computing device. Examples of communication infrastructure 1112 include, without limitation, a communication bus (such as an Industry Standard Architecture (ISA), Peripheral Component Interconnect (PCI), PCI Express (PCIe), or similar bus) and a network.

Memory controller 1118 generally represents any type or form of device capable of handling memory or data or controlling communication between one or more components of computing system 1110. For example, in certain embodiments memory controller 1118 may control communication between processor 1114, system memory 1116, and I/O controller 1120 via communication infrastructure 1112.

I/O controller 1120 generally represents any type or form of module capable of coordinating and/or controlling the input and output functions of a computing device. For example, in certain embodiments I/O controller 1120 may control or facilitate transfer of data between one or more elements of computing system 1110, such as processor 1114, system memory 1116, communication interface 1122, display adapter 1126, input interface 1130, and storage interface 1134.

As illustrated in FIG. 11, computing system 1110 may also include at least one display device 1124 coupled to I/O controller 1120 via a display adapter 1126. Display device 1124 generally represents any type or form of device capable of visually displaying information forwarded by display adapter 1126. Similarly, display adapter 1126 generally represents any type or form of device configured to forward graphics, text, and other data from communication infrastructure 1112 (or from a frame buffer, as known in the art) for display on display device 1124.

As illustrated in FIG. 11, exemplary computing system 1110 may also include at least one input device 1128 coupled to I/O controller 1120 via an input interface 1130. Input device 1128 generally represents any type or form of input device capable of providing input, either computer or human generated, to exemplary computing system 1110. Examples of input device 1128 include, without limitation, a keyboard, a pointing device, a speech recognition device, variations or combinations of one or more of the same, and/or any other input device.

Additionally or alternatively, exemplary computing system 1110 may include additional I/O devices. For example, exemplary computing system 1110 may include I/O device 1136. In this example, I/O device 1136 may include and/or represent a user interface that facilitates human interaction with computing system 1110. Examples of I/O device 1136 include, without limitation, a computer mouse, a keyboard, a monitor, a printer, a modem, a camera, a scanner, a microphone, a touchscreen device, variations or combinations of one or more of the same, and/or any other I/O device.

Communication interface 1122 broadly represents any type or form of communication device or adapter capable of facilitating communication between exemplary computing system 1110 and one or more additional devices. For example, in certain embodiments communication interface 1122 may facilitate communication between computing system 1110 and a private or public network including additional computing systems. Examples of communication interface 1122 include, without limitation, a wired network interface (such as a network interface card), a wireless network interface (such as a wireless network interface card), a modem, and any other suitable interface. In at least one embodiment, communication interface 1122 may provide a direct connection to a remote server via a direct link to a network, such as the Internet. Communication interface 1122 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1122 may also represent a host adapter configured to facilitate communication between computing system 1110 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1122 may also allow computing system 1110 to engage in distributed or remote computing. For example, communication interface 1122 may receive instructions from a remote device or send instructions to a remote device for execution.

In some examples, system memory 1116 may store and/or load a network communication program 1138 for execution by processor 1114. In one example, network communication program 1138 may include and/or represent software that enables computing system 1110 to establish a network connection 1142 with another computing system (not illustrated in FIG. 11) and/or communicate with the other computing system by way of communication interface 1122. In this example, network communication program 1138 may direct the flow of outgoing traffic that is sent to the other computing system via network connection 1142. Additionally or alternatively, network communication program 1138 may direct the processing of incoming traffic that is received from the other computing system via network connection 1142 in connection with processor 1114.

Although not illustrated in this way in FIG. 11, network communication program 1138 may alternatively be stored and/or loaded in communication interface 1122. For example, network communication program 1138 may include and/or represent at least a portion of software and/or firmware that is executed by a processor and/or ASIC incorporated in communication interface 1122.

As illustrated in FIG. 11, exemplary computing system 1110 may also include a primary storage device 1132 and a backup storage device 1133 coupled to communication infrastructure 1112 via a storage interface 1134. Storage devices 1132 and 1133 generally represent any type or form of storage device or medium capable of storing data and/or other computer-readable instructions. For example, storage devices 1132 and 1133 may be a magnetic disk drive (e.g., a so-called hard drive), a solid state drive, a floppy disk drive, a magnetic tape drive, an optical disk drive, a flash drive, or the like. Storage interface 1134 generally represents any type or form of interface or device for transferring data between storage devices 1132 and 1133 and other components of computing system 1110.

In certain embodiments, storage devices 1132 and 1133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1132 and 1133 may also include other similar structures or devices for allowing computer software, data, or other computer-readable instructions to be loaded into computing system 1110. For example, storage devices 1132 and 1133 may be configured to read and write software, data, or other computer-readable information. Storage devices 1132 and 1133 may also be a part of computing system 1110 or may be a separate device accessed through other interface systems.

Many other devices or subsystems may be connected to computing system 1110. Conversely, all of the components and devices illustrated in FIG. 11 need not be present to practice the embodiments described and/or illustrated herein. The devices and subsystems referenced above may also be interconnected in different ways from that shown in FIG. 11. Computing system 1110 may also employ any number of software, firmware, and/or hardware configurations.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A special-purpose hardware accelerator comprising:
   a cache configured to store an input matrix related to performing a convolution operation; and
   a matrix-multiplication subsystem pre-configured with matrix-transform coefficients for performing matrix-transform operations, wherein the matrix-multiplication subsystem is configured to perform the convolution operation by:
   reading the input matrix from the cache;
   transforming the input matrix via matrix multiplication;
   transforming, via matrix multiplication, a parameter matrix that comprises convolution parameters for performing the convolution operation;
   applying the transformed parameter matrix to the transformed input matrix via an element-wise multiplication operation; and
   performing an inverse-transformation operation on the results of the element-wise multiplication operation to create an output matrix for the convolution operation.

2. The special-purpose hardware accelerator of claim 1, wherein the matrix-multiplication subsystem uses the pre-configured matrix-transform coefficients to at least one of:
   transform the input matrix;
   transform the parameter matrix; or
   perform the inverse-transformation operation on the results of the element-wise multiplication operation.

3. The special-purpose hardware accelerator of claim 1, wherein the pre-configured matrix-transform coefficients comprise at least one of:
   pre-configured coefficients for transforming the input matrix;
   pre-configured coefficients for transforming the parameter matrix; or
   pre-configured coefficients for performing the inverse-transformation operation on the results of the element-wise multiplication operation.

4. The special-purpose hardware accelerator of claim 3, wherein the pre-configured matrix-transform coefficients comprise at least one of:
   a transposed version of the pre-configured coefficients for transforming the input matrix;
   a transposed version of the pre-configured coefficients for transforming the parameter matrix; or
   a transposed version of the pre-configured coefficients for performing the inverse-transformation operation on the results of the element-wise multiplication operation.

5. The special-purpose hardware accelerator of claim 1, wherein the matrix-multiplication subsystem comprises at least one of:
   a dot-product engine configured to perform the matrix-transform operations; or
   an element-wise multiplier configured to perform the element-wise multiplication operation.

6. The special-purpose hardware accelerator of claim 5, wherein the matrix-multiplication subsystem transforms the input matrix on-the-fly when reading the input matrix from the cache to the element-wise multiplier.

7. The special-purpose hardware accelerator of claim 5, wherein the parameter matrix is stored in the cache and the matrix-multiplication subsystem transforms the parameter matrix on-the-fly when reading the parameter matrix from the cache to the element-wise multiplier.

8. The special-purpose hardware accelerator of claim 1, wherein the matrix-multiplication subsystem performs the inverse-transformation operation on-the-fly when storing the output matrix to the cache.

9. The special-purpose hardware accelerator of claim 1, wherein:
   the input matrix comprises the entirety of an input volume for the convolution operation;
   transforming the input matrix via matrix multiplication comprises transforming the entire input volume via matrix multiplication; and
   the output matrix comprises the entirety of an output volume for the convolution operation.

10. The special-purpose hardware accelerator of claim 1, wherein:
    the input matrix comprises an initial portion of an input volume for the convolution operation;
    transforming the input matrix via matrix multiplication comprises transforming the initial portion of the input volume via matrix multiplication; and
    creating the output matrix comprises creating an initial portion of an output volume for the convolution operation.

11. The special-purpose hardware accelerator of claim 10, wherein performing the convolution operation further comprises:
    receiving at least one additional portion of the input volume from the cache;
    transforming the additional portion of the input volume via matrix multiplication;
    applying, via an additional element-wise multiplication operation, the transformed parameter matrix to the additional portion of the input volume that was transformed; and
    performing an additional inverse-transformation operation on the results of the additional element-wise multiplication operation to create an additional portion of the output volume for the convolution operation.

12. The special-purpose hardware accelerator of claim 1, wherein the special-purpose hardware accelerator is configured to:
    pose each of a plurality of element-wise multiplication operations as a plurality of dot-product operations; and
    batch the plurality of dot-product operations into a single matrix-multiplication operation for processing by the matrix-multiplication subsystem.

13. A computing system comprising:
    a memory device configured to store an input matrix related to performing a convolution operation; and
    a special-purpose hardware accelerator comprising a matrix-multiplication subsystem that is pre-configured with matrix-transform coefficients for performing matrix-transform operations, wherein the matrix-multiplication subsystem is configured to perform the convolution operation by:
    reading the input matrix from the memory device;
    transforming the input matrix via matrix multiplication;
    transforming, via matrix multiplication, a parameter matrix that comprises convolution parameters for performing the convolution operation;
    applying the transformed parameter matrix to the transformed input matrix via an element-wise multiplication operation; and
    performing an inverse-transformation operation on the results of the element-wise multiplication operation to create an output matrix for the convolution operation.

14. The computing system of claim 13, wherein:
the matrix-multiplication subsystem comprises a cache; and
reading the input matrix from the memory device comprises:
storing the input matrix from the memory device into the cache; and
reading the input matrix from the cache.

15. The computing system of claim 14, wherein the matrix-multiplication subsystem comprises at least one of:
a dot-product engine configured to perform the matrix-transform operations; or
an element-wise multiplier configured to perform the element-wise multiplication operation.

16. The computing system of claim 15, wherein:
the matrix-multiplication subsystem transforms the input matrix on-the-fly when reading the input matrix from the cache to the element-wise multiplier; and
the parameter matrix is stored in the cache and the matrix-multiplication subsystem transforms the parameter matrix on-the-fly when reading the parameter matrix from the cache to the element-wise multiplier.

17. The computing system of claim 14, wherein the matrix-multiplication subsystem performs the inverse-transformation operation on-the-fly when storing the output matrix to the cache.

18. The computing system of claim 13, wherein the matrix-multiplication subsystem uses the pre-configured matrix-transform coefficients to at least one of:
transform the input matrix;
transform the parameter matrix; or
perform the inverse-transformation operation on the results of the element-wise multiplication operation.

19. The computing system of claim 13, wherein the pre-configured matrix-transform coefficients comprise at least one of:
pre-configured coefficients for transforming the input matrix;
pre-configured coefficients for transforming the parameter matrix; or
pre-configured coefficients for performing the inverse-transformation operation on the results of the element-wise multiplication operation.

20. A computer-implemented method comprising:
reading, from a cache of a special-purpose hardware accelerator, an input matrix related to performing a convolution operation, wherein the special-purpose hardware accelerator is pre-configured with matrix-transform coefficients for performing matrix-transform operations; and
performing, using the special-purpose hardware accelerator, the convolution operation by:
transforming the input matrix via matrix multiplication;
transforming, via matrix multiplication, a parameter matrix that comprises convolution parameters for performing the convolution operation;
applying the transformed parameter matrix to the transformed input matrix via an element-wise multiplication operation; and
performing an inverse-transformation operation on the results of the element-wise multiplication operation to create an output matrix for the convolution operation.

* * * * *